United States Patent
Wulff

[19]

[11] Patent Number: 6,161,590
[45] Date of Patent: Dec. 19, 2000

[54] WELDER'S WINDGUARD

[75] Inventor: Darwin Wulff, Lloydminster, Canada

[73] Assignee: 844426 Alberta Ltd., Lloydminster, Canada

[21] Appl. No.: 09/440,211

[22] Filed: Nov. 15, 1999

[51] Int. Cl.[7] .................................................. F16L 57/00
[52] U.S. Cl. ......................... 138/110; 138/159; 138/178; 266/903
[58] Field of Search .................................. 138/106, 110, 138/159, 160, 178; 219/137.43, 147; 359/601; 266/903; 228/21

[56] References Cited

U.S. PATENT DOCUMENTS

| | | | |
|---|---|---|---|
| 2,227,944 | 1/1941 | Mayne | 359/601 |
| 2,235,594 | 3/1941 | Smith | 219/147 |
| 2,390,149 | 12/1945 | Hopper | 219/147 |
| 2,410,306 | 10/1946 | Romberg | 219/147 |
| 3,237,716 | 3/1966 | Parsons | 138/178 |
| 3,871,145 | 3/1975 | Hatmaker | 138/162 |
| 4,125,237 | 11/1978 | Hagins | 138/106 |
| 4,269,901 | 5/1981 | Chamberlain | 266/903 |
| 4,865,490 | 9/1989 | Wallace . | |
| 5,241,154 | 8/1993 | Estrate . | |
| 5,854,461 | 12/1998 | Sorenson . | |

*Primary Examiner*—James Hook
*Attorney, Agent, or Firm*—Marsh Fischmann & Breyfogle LLP

[57] ABSTRACT

A portable windguard for use on a pipe to shield a weld being applied from wind comprising a collar, a Velcro™ belt for attaching and securing the collar to the pipe and a shield extending generally perpendicularly from the collar. The shield can be collapsible, hence readily transportable from site to site.

4 Claims, 3 Drawing Sheets

WELDER'S WINDGUARD

FIELD OF THE INVENTION

The present invention relates to a portable structure and more particularly to an easily erected, temporary, collapsible windguard for use on a pipeline when a welder is making a weld.

BACKGROUND OF THE INVENTION

It is important that an environment is provided, for a welder fabricating or repairing a pipeline, that is shielded from the wind in order to prevent the wind from pushing the molten metal away from the desired location when doing a weld.

Traditionally, a windboard has been used to shield a welding site on a pipeline from the wind. A typical windboard comprises a square piece of plywood with semicircular cut-outs of different sizes, formed along the margin of the board to accommodate different diameter pipe. The board is held upright from the pipe with the cut-out fitting around it.

One problem with the windboard, however, is that it is awkward for the welder to transport from site to site. Further, the windboard is not attachable to the pipe and therefore it is necessary for a second person to hold the windboard in place while the welder welds the pipe.

One object of the invention is to provide a windguard that is easily and reversibly attachable to a portion of pipe.

Another object of the invention is to provide a windguard that is adjustable to accommodate a wide range of diameter pipes, typically 2 to 24 inches in diameter.

Another object of the invention is to provide a windguard that is collapsible, hence easily transportable from site to site.

SUMMARY OF THE INVENTION

In one broadly stated aspect of the invention, a welder's windguard is provided comprising:

a collar having means for disengagably securing the collar around a pipe; and a shield attached to the collar and extending angularly therefrom so that it assumes an upright or generally radial position when the collar is mounted to the pipe.

In a preferred embodiment of the invention, a welder's windguard is provided comprising:

a longitudinally split collar having two free ends and further having an adjustable securing means for securing the collar around a pipe;

a collapsible shield for extending angularly out from the collar; and the shield having a plurality of spaced apart stiffeners attached to the collar and extending radially and substantially perpendicularly from the collar for supporting the shield.

In a more preferred embodiment, the shield is made from a flexible, fire-retardant material such as canvas and the stiffeners are L-shaped rods. One leg of the rod runs along the collar and the other leg extends across the shield. The former leg is rotatably attached to the collar so that the windguard can be folded much like an accordion.

DESCRIPTION OF THE PREFERRED EMBODIMENT

Figure 1:
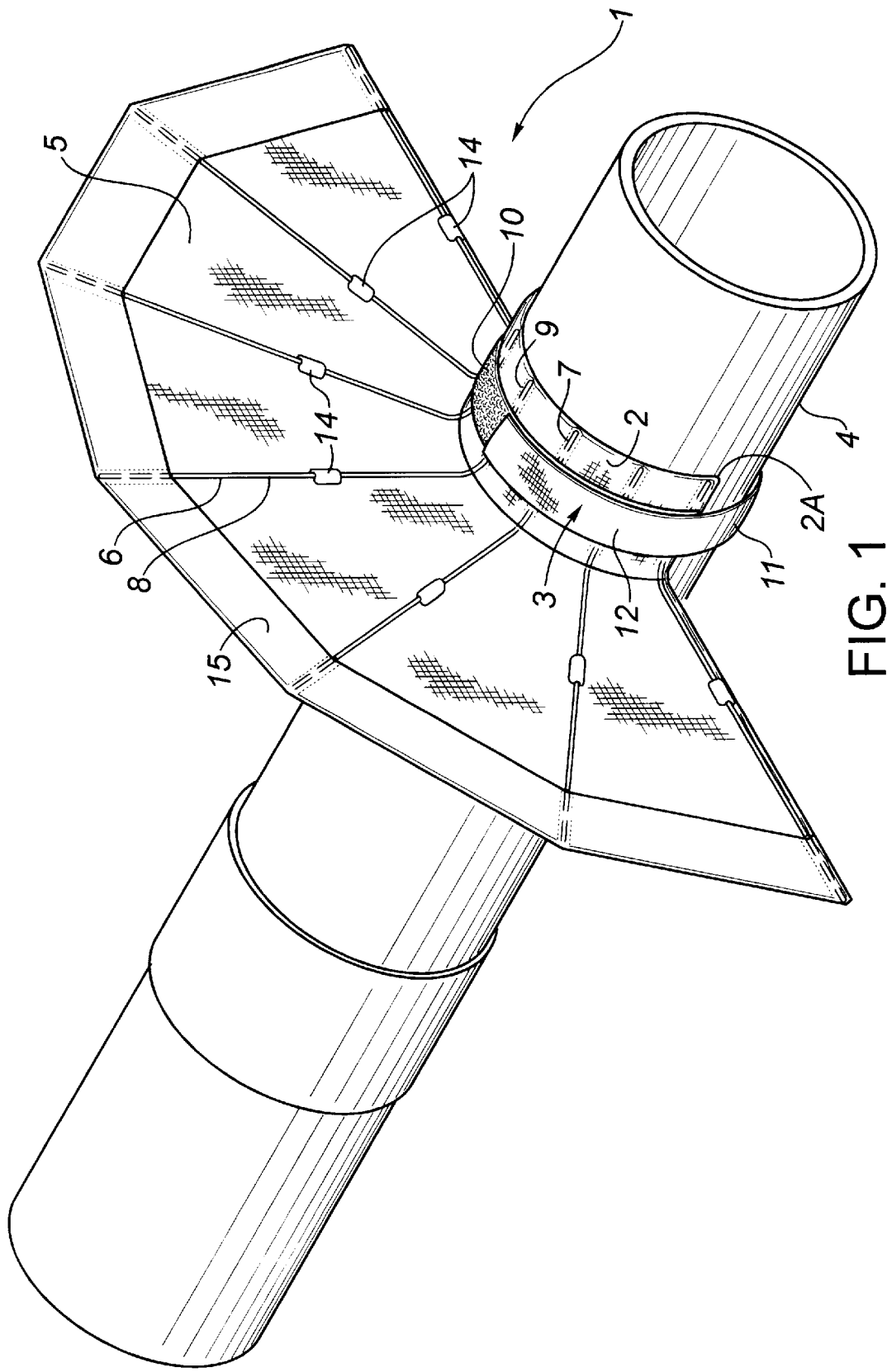
FIG. 1 is a perspective view of the windguard in its extended configuration, secured around a pipe.
Figure 2:
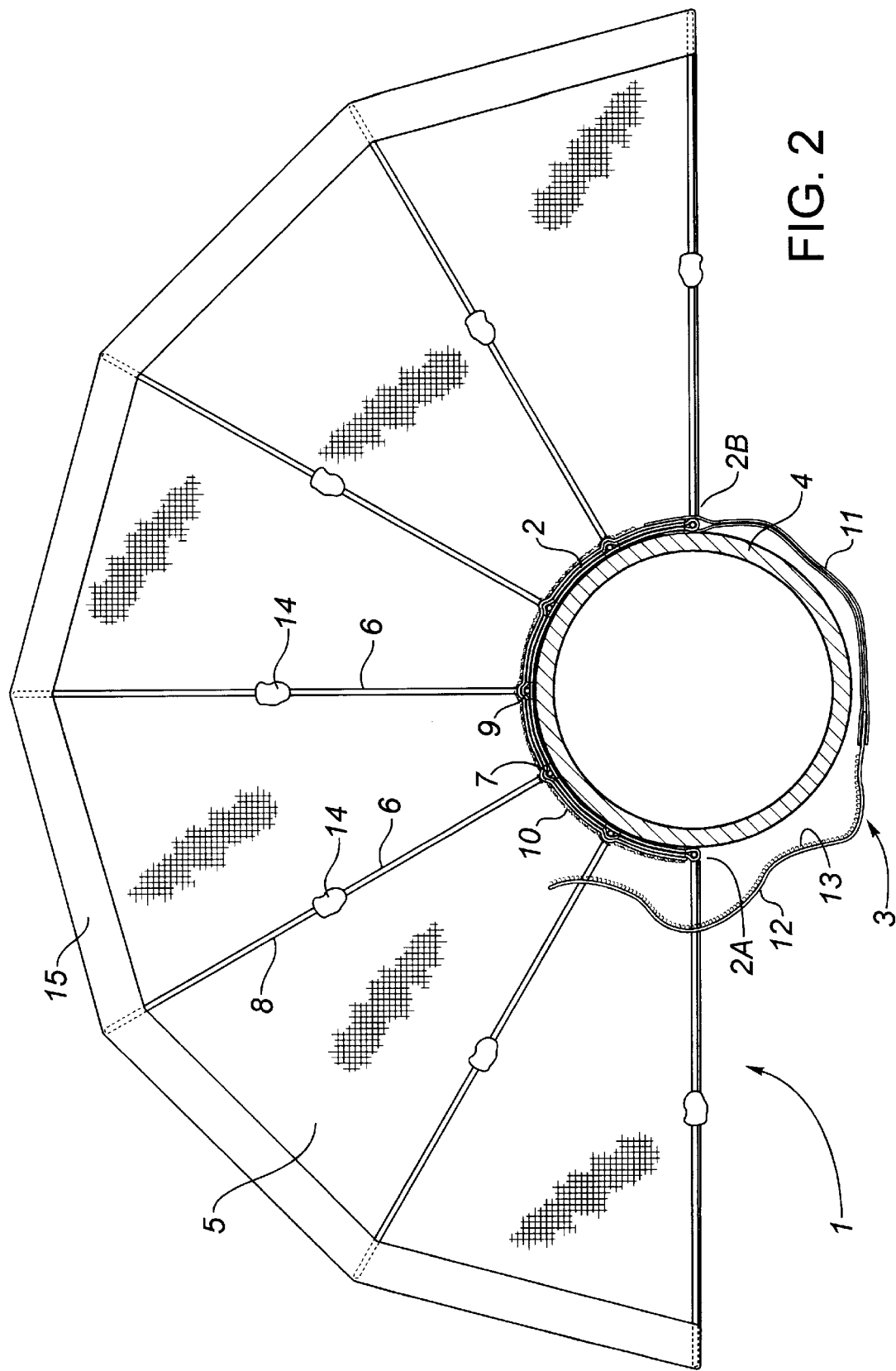
FIG. 2 is a front view of the windguard showing the adjustable securing means.
Figure 3:
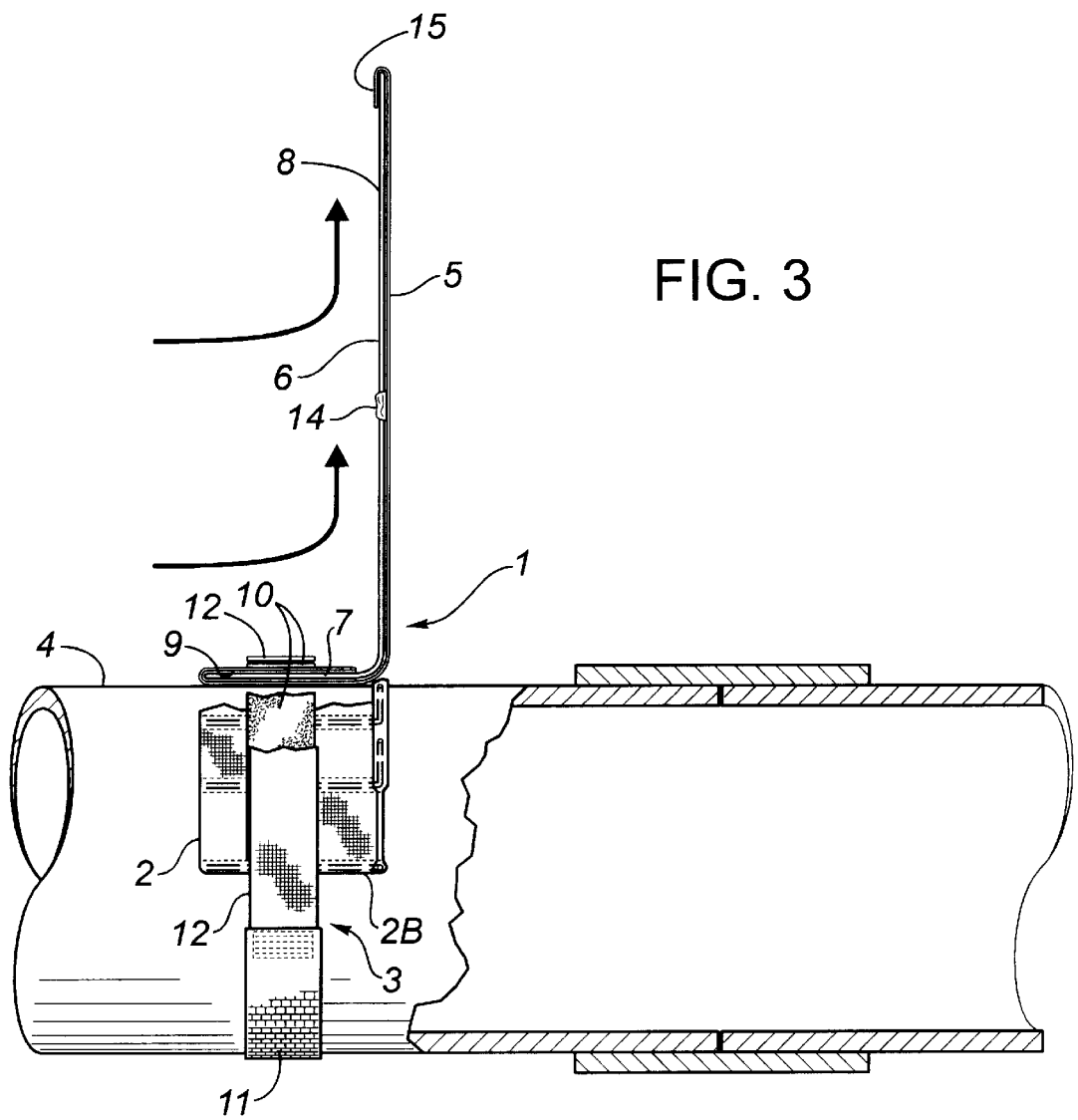
FIG. 3 is a side view of the windguard showing the right angle configuration of the stiffeners.

Having reference to the FIGS. 1, 2 and 3, the windguard 1 comprises a collar 2, means 3 for clamping and securing the collar 2 around a pipe 4, and a shield 5 projecting angularly from the collar 2.

The collar 2 and shield 5 are formed of non-flammable canvas. Therefore they are readily flexible.

The collar 2 is a sleeve, split longitudinally, so that its two free ends 2a, 2b can be fitted around the pipe 4. The two free ends 2a, 2b can overlap to adjust the collar 2 to the outside diameter of the pipe. The shield 5 has a hem 15 at its end furthest away from the collar 2.

A plurality of spaced apart stiffeners 6 extend along the collar 2 and across the shield 5. Each stiffener 6 is a metal rod of right angle configuration having first and second legs 7,8. The first leg 7 is rotatably secured to the collar 2 by inserting it into a pocket 9 that is located on the collar 2. The second leg 8 is inserted into the hem 15 and further secured to the shield 5 by a fastening means such as glue 14. The stiffeners function to hold the shield 5 generally upright relative to the collar 2 when the latter is secured around the pipe 4. They also function to stretch the shield 5 into an extended configuration, much like a fan. The means 3 for clamping and securing the collar 2 around the pipe 4 comprises a Velcro™ loop section 10 attached to the outside of the collar 2, said velcro loop section 10 essentially extending the entire length of the collar 2. Attached to one end of the collar 2 is an elastic strip 11. Attached to the elastic strip 11 is a strap 12 having a Velcro™ hook fibre section 13 which is of a sufficient length so that when the collar 2 is wrapped around the pipe 4, the strap 12 will also wrap around the pipe 4. The Velcro™ hook fibre section 12 then comes in contact with the Velcro™ loop section 10 thereby clamping and securing the windguard 1 to the pipe 4. The elastic strip 11 ensures that the windguard 1 is snugly secured to the pipe 4 by providing tension.

The embodiments of the invention in which an exclusive property or privilege is claimed are defined as follows:

1. A portable windguard for use on a pipe to shield a weld being applied from wind comprising:

a longitudinally split collar;

adjustable means for disengagably securing the collar around the pipe;

a collapsible shield, attached to the collar and extending angularly therefrom; and a plurality of spaced apart stiffeners, secured to the collar and shield.

2. The windguard as set forth in claim 1 wherein:

each stiffener is an L-shaped rod having first and second legs, the first leg being rotatably secured to the collar, the second leg being secured to the shield; and the collar and shield are formed of flexible material.

3. The windguard as set forth in claim 1 wherein the collar and shield arc formed of flexible material.

4. The windguard as set forth in claim 1 wherein the collar and shield are formed of fire retardant material.

* * * * *